United States Patent [19]

Simpson

[11] Patent Number: 4,619,122

[45] Date of Patent: Oct. 28, 1986

[54] THREADABLY ENGAGED LOCKING MECHANISM

[76] Inventor: Harold N. Simpson, 10 Paul VI, Chateauquay, Quebec, Canada

[21] Appl. No.: 686,033

[22] Filed: Dec. 24, 1984

[51] Int. Cl.⁴ .............................................. E05B 67/36
[52] U.S. Cl. ....................................... 70/34; 411/329;
411/403; 70/232
[58] Field of Search ................ 70/32, 33, 34, 23, 229,
70/231, 232; 411/326, 327, 328, 329, 402, 403,
407, 408

[56] References Cited

U.S. PATENT DOCUMENTS

| 1,555,229 | 9/1925 | Offelder | 70/34 |
| 1,971,797 | 8/1934 | Shinn | 70/32 |
| 2,018,745 | 10/1935 | Schlitz | 70/34 |
| 2,999,379 | 9/1961 | Raye | 70/32 |
| 3,726,115 | 4/1973 | Wellekens | 70/33 |
| 3,785,670 | 1/1974 | Smith | 70/34 |
| 4,152,909 | 5/1979 | Lundberg | 70/34 |
| 4,193,276 | 3/1980 | Lundberg | 70/34 |
| 4,480,513 | 11/1984 | McCauley | 411/403 |

FOREIGN PATENT DOCUMENTS 296860 9/1928 United Kingdom ................. 70/231

Primary Examiner—Robert L. Wolfe
Attorney, Agent, or Firm—David J. French

[57] ABSTRACT

A two-part threaded locking mechanism is provided with complementary stop elements in the form of a pin and a recess that interengage when the two lock elements are threaded together. When used as a padlock, the locking mechanism may be encased in a tapered, spinnable, protective shroud. To facilitate assembly, the recess may be made larger than the pin and the surface adjacent the recess facing the pin may be spirally ramped.

9 Claims, 5 Drawing Figures

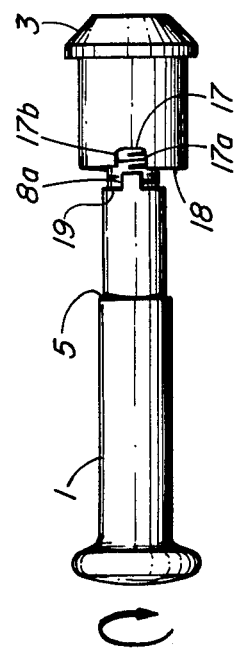
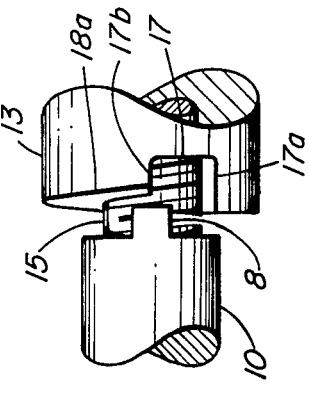
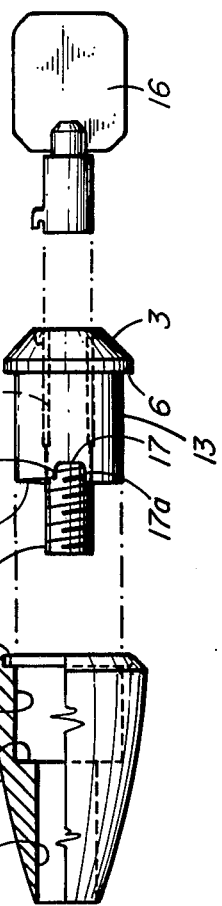
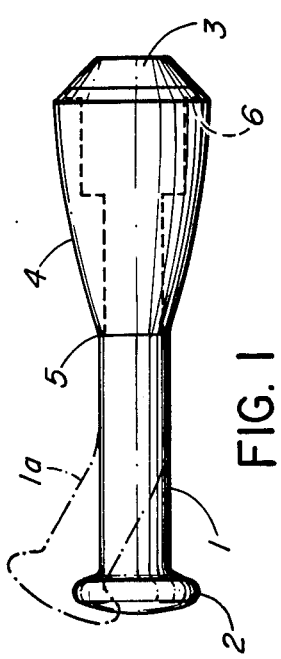
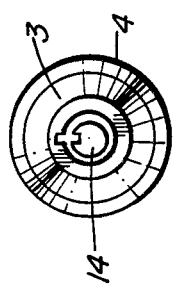
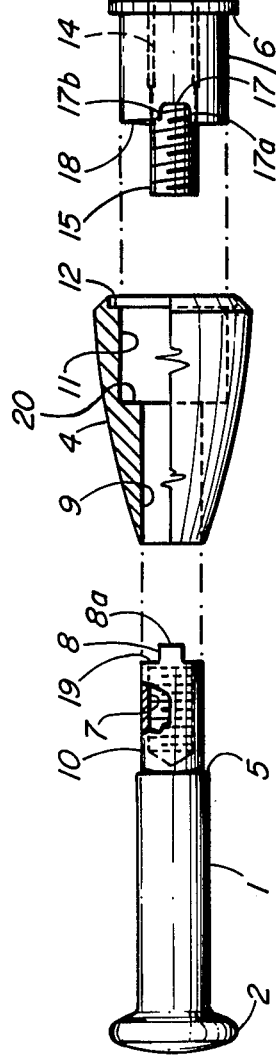

THREADABLY ENGAGED LOCKING MECHANISM

FIELD OF THE INVENTION

This invention relates to a lock in which the component parts are threadably engaged. More particularly this invention relates to a straight shackled padlock or mushroom-headed pin padlock in which threaded and axially-engaging locking elements are enclosed within an outer protective shroud or casing.

BACKGROUND OF THE INVENTION

Locks adapted for threaded engagement between the pieces to be locked together are known. Such locks rely on the high resistance of threaded couplings to axial separating forces. This is to be contrasted with locks that rely upon a sliding bolt or pawl mechanism.

In the usual case for a threaded locking system the presence of a key is required in order to rotate the male and female threaded components with respect to each other and effect axial engagement or disengagement of these parts. Generally, the key is placed within a cylindrical core or plug within an outer housing. Relative rotation. between the cylindrical core and the outer housing may only occur with the key properly installed within the core of the locking mechanism. A threaded element is then attached to the lock core so as to be carried therewith.

In locks of this latter configuration, the housing may be fixed, as in a door frame, so that the housing itself will not rotate. But where such a threaded lock mechanism is to be adapted for use in a padlock, it is desirable to incorporate furthur provision into the lock structure to prevent the rotational disengagement of the threaded elements once they have been threadably engaged. This is because, in the case of a padlock, the housing is not fixed to any exterior support structure.

Therefore, one of the objects of this invention is to provide a means for locking threadably engaged locking elements against rotational disengagement.

Another object of this invention is to adapt the system of threaded engagement to a straight shackled padlock.

A further object is to provide a threadably engaged straight shackled padlock with a protective housing and an improved means foor ensuring convenient assembly of the lock in the field.

SUMMARY OF THE INVENTION

According to this invention two complementary threadably engageable locking elements are provided with complementary rotational stop means which may be drawn into interengagement by advancing the threaded engagement of said locking elements. The stop means on one of the aforesaid elements is attached to a housing surrounding a key-carrying core. The core, in turn, carries and is coupled to the threaded portion for one of the two locking elements.

By a further feature of the invention the rotational stop means comprises a radially deployed and axially aligned protrusion attached to one locking element and a complementary interfitting annular recess formed in the body of the second locking element, the recess being larger in its circumferential dimension than the circumferential dimension of the protrusion.

By a further feature of the invention the top surface of the end wall of the annular recess is ramped away from the protrusion in the direction of advance of the protrusion when the locking elements are being threadably engaged, so as to provide clearance for the protrusion as it advances towards being seated in the recess.

A further feature of the invention is its adaption to serve as a padlock in which one of the locking elements comprises a threaded, mushroom-headed pin.

By a further feature of the invention, the rotational stop means are contained within a protective casing which is free to rotate axially and is tapered in a generally conical manner with its outer surface closing towards and merging at one end with the outer surface of the mushroom-headed pin.

These and further features of the invention will become apparent from the description of the illustrated embodiment and claims which follow.

SUMMARY OF THE DRAWINGS

In the drawings:

FIG. 1 is a side-view of a mushroom-headed pin padlock incorporating the invention;

FIG. 2 is an exploded view of the lock of FIG. 1;

FIG. 3 is an end view showing the key passageway in the lock;

FIG. 4 is a view of thhe lock without its shroud as it is being threaded together; and FIG. 5 is an enlarged view of the protrusion on the pin passing over a ramped end surface adjacent to the recess on the lock housing.

DESCRIPTION OF THE ILLUSTRATED EMBODIMENT

FIG. 1 shows a view of the lock as assembled. Its parts include a mushroom-headed pin 1 which may be either straight or curved, as depicted in ghost outline 1a. Curvature in the pin 1 may be provided in order to permit the pin to be slid through the eye of a hasp mounted within a recess where access is limited. An enlarged knob 2 is formed on the end of the pin 1 to limit its travel through the eye of a hasp and gives the pin a generally mushroomed shape or appearance.

Surrounding the other end of the pin 1 is the body of the locking assembly mechanism 3, of which only the lower end appears in FIG. 1. This body is encased in an outer protective casing or shroud 4 which is generally conical in shape. This shroud 4 is held in position between a small shoulder 5 on the pin 1, and a flange 6 on the end of the lock assembly mechanism 3. Preferably, the outer shroud 4 is free to rotate about the pin 1 and locking mechanism 3. In such cases, the pin 1 at the shoulder 5 and the flange 6 will be of circular cross-section. The ability of the outer shroud 4 to rotate will deter attempts to apply a hack saw blade to this component, since the shroud would then tend to turn as the blade is applied thereto.

The respective components of the lock are shown in exploded view in FIG. 2. On the pin 1 at the end opposite to the knob 2, a threaded portion 7 is formed along an interior axial cavity in the end of the pin 1. A rotational stop element in the form of a radially deployed and axially aligned protrusion 8 extends from the end of the pin 1.

The outer protective shroud 4 has a first inner circular bore 9 of a diameter such as to provide a close sliding fit over the narrowed region 10 of the pin 1 below the shoulder 5. This fit provides a degree of weather tightness to protect the lock assembly mechanism from the elements. The shroud 4 also has a second inner circular bore 11 of a diameter adapted to receive the lock assembly mechanism 3. When assembled, the flange 6 seats on the shoulder 12 formed within the shroud 4 at the end of the second inner bore 11.

The lock assembly mechanism 3 shown in FIG. 2 is an adaption of an off-the-shelf split-pin type of cylindrical lock, such as the ACE brand lock of the Chicago Lock Company. This lock assembly is provided with a threaded bolt attached to the lock core and is typically used in vending machines. The precise form of locking mechanism used within the lock assembly 3 is not critical. It is sufficient if the lock mechanism has, as shown in FIG. 2, an exterior housing 13, which may contain a split-pin locking mechanism; an inner cylindrical core or key plug 14, shown in the end view in FIG. 3 and in outline only in FIG. 2; a threaded coupling element, such as a bolt 15 shown in FIG. 2 which is axially attached to the core 14; and provision for the lock core 14 to rotate carrying the threaded element 15 with it when the key 16 is engaged, and for the core 14 to become lockably coupled to the housing 13 when the key 16 is removed.

Within the housing 13, a complementary rotational stop element to that on the shackle is provided in the form of a radially deployed annular recess 17. This recess 17 is dimensioned and positioned so as to become aligned with and receive the protrusion 8 when the threaded element 10, 15 are engaged and have been drawn into the fully mated position.

FIG. 4 shows the inner components of the lock, without the shroud 4, at the point when the components are about to be assembled into the fully mated position. For combined strength and convenience of assembly, the threadably engaging portions of the threaded elements 10, 15 are of greater axial length than the protrusion 8. The first stage of assembly therefor comprises engaging the threaded elements 10, 15 to the point where the end 8a of the protrusion 8 has just arrived at the plane of the end 8 of the lock assembly housing 13. At this point, it is important for the proper operation of the lock that the protrusion 8 be aligned with the recess 17 so that on further advancement of the threaded engagement between the pin 1 and the lock assembly 3, the protrusion will enter the recess 17.

Due to the first inner stop surface 17a which comprises one boundary of the recess 17, the components cannot be further threadably engaged unless the core 14 and bolt 15 are disengaged from the housing 13 by the insertion of the key 16. Further rotation of the core 14 with respect to the pin 1 may then be effected using the fully engaged key 16 as a handle by which the key plug 14 may be turned.

The threaded engagement of the pin 1 and lock assembly 3 may proceed until either the protrusion 8 seats at the end of the recess 17, or the end 19 of the pin 1 seats against the end 18 of the lock assembly housing 13. It is, however, only essential that such threaded engagement be sufficient that, upon removal of the key 10 and upon an attempt to unthread the lock assembly 3 from the pin 1, the protrusion 8 has sufficiently penetrated the recess that it strikes the second inner stop surface 17b. In this condition the components have been effectively locked together and may not be disassembled without use of the key 16.

In forming the protrusion 8 and recess 17 on the respective components, care must be taken to ensure that the advancement of the end 8a of the protrusion 8 is synchronized with the advancement of the threaded elements 10, 15 so as to register or be aligned with the recess 17 when the end of the protrusion 8 reaches the plane of the end 18 of the housing 13. This may be accomplished by grinding the end 8a of the protrusion 8 until an appropriate length to achieve this condition is obtained or by cutting the threads to achieve such synchronization.

The critical nature of the tolerances involved in effecting such synchronization may be reduced by enlarging the recess 17 in a circumferential direction so that the circumferential dimension of the recess 17 substantially exceeds the circumferential dimension of the protrusion 8. At the limit, the first and second stop surfaces 17a, 17b of the recess 17 may become virtually back-to-back of each other, forming a narrow residual radial wall. In such case, it is only essential that this radial wall be of sufficient dimension to have the requisite strength to resist rotational disengagement of the two threaded elements when the key has been removed and the article is in its locked mode.

To reduce the risk that the end of the protrusion 8 may land on and jam against the opposed top surface of this radial wall, such surface may be ramped away from the protrusion in the direction of its advance at an angle equal to or greater than the rate of advance of the threads in the threaded position. This is shown in greater detail in FIG. 5 where the end 18 of the housing 13 has an inclined surface 18a over which the protrusion 8 may freely pass in approaching the recess 17.

In the preferred embodiment as described, the threaded elements 10, 15 are longer than the protrusion 8. This permits threaded engagement to be established initially between the components parts without the necessity of inserting the key. Extension of the degree of threaded engagement will enhance the resistance of the lock to being axially pried apart by an applied external force.

In order to minimize the tendency of the bolt 15 to pull the core 14 out of the housing 13, the inner shoulder 20 formed within the second circular bore 11 may overlap and be opposed to the end of the core 14 adjacent the end 18 of the housing 13, rather than just overlapping the housing.

The shape of the shroud 4 is of particular utility where it is used as part of a padlock, whether or not the rotational stop means described heerin is employed The outer protective casing may be shaped in a generally conical manner, gradually enlarging in the direction proceeding away from the pin. Such an outer shape will provide minimum purchase for a crow-bar to be applied between the lock body and the pin in an attempt to force separation. The outer conical surface of such a casing should merge with the outside surface of the hasp without presenting a shoulder or protrusion, for similar reasons.

The included angle of the conic section should be kept to the minimum consistent with encasing the lock assembly mechanism with a sufficiently thick protective wall of not unduly extended length. The range of 20–30° has been found practical in this respect. Both of these objectives may be further better accomplished by providing the outer surface of the shroud 4 with a positive curvature that causes the surface to bulge outwardly in its middlle region. A continuously tapered outer surface for the shroud 4, even if not of a constant value, is useful to reduce the purchase that might be obtained in attempting to fasten clamping apparatus to the shroud 4.

The foregoing embodiment has been depicted as having a female portion 10 on the pin 1 and a male threaded bolt 15 on the lock assembly mechanism 3. These may be intercharged without affecting the principle of the invention.

Further, the rotational stop elements have been shown as comprising a radially deployed protrusion 8 mounted on the end of pin 1, and a radially formed annular recess 17 within the housing 13. These components may, as well, be interchanged and need not be formed in the immediate end of the pin 1 and housing 13 respectively. It is sufficient if such parts are of complementary form and disposition so that they may be interfitted axially when properly aligned.

The foregoing embodiment has been based upon the example of a mushroom-headed pin padlock. The invention at as it relates to threadably engaged locking elements may be equally applied in a case where the pin 1 is substituted by any form of locking element which presents a threaded portion and requires a radially deployed rotational stop element to engage with and resist rotation of a lock assembly mechanism which presents complementary formed threaded and rotational stop elements.

The above description illustrates one example of an embodiment of the invention which is more generally and specifically identified by the claims which follow hereafter.

What is claimed is:

1. A threadably engaged locking mechanism comprising:
    (a) a first locking element, in the form of a mushroom-headed pin, provided with a threaded portion on one end thereof;
    (b) a second locking element in the form of a lock assembly mechanism having formed on said second element a complementary threaded element to the threaded portion of said first locking element;
    (c) a pair of complementary longitudinally engageable rotational stop means being respectively formed on said first and second locking elements, said pair of stop means being encased in a protective casing that prevents direct access thereto from the exterior,
wherein the said pair of stop means may be drawn into interengagement by advancing the threaded engagement between said first and second locking elements; and wherein the threaded element on said second locking mechanism is attached to a key-receiving core within and lockably engageable with a housing forming part of said lock assembly and wherein said stop means associated with said lock assembly mechanism is attached to said housing.

2. A locking mechanism as in claim 1 wherein said protective casing is free to rotate axially about the encased rotational stop means.

3. A locking mechanism as in claim 1 wherein said rotational stop elements comprise a complementary, axially aligned, annular protrusion ans recess, respectively, in which the circumferential dimensions of said recess exceeds the circumferential dimension of said protrusion.

4. A locking mechanism as in claim 3 wherein one of said locking elements presents towards the end of said protrusion a spiralled surface that is inclined away from said protrusion and terminates at the upper edge of said recess.

5. A locking mechanism as in claim 4 wherein the angle of inclination of said spiralled surface equals the pitch of the threading of said threaded elements.

6. A locking mechanism as in claim 5 wherein said protective casing is free to rotate axially about the encased rotational stop means.

7. A padlock comprised of a pin, a key housing, and a protective shroud, said pin having a knob formed on one end thereof and locking means formed on the other end thereof, said locking means being adapted to engage with complementary key-activated locking means attached to said key housing, said locking means and complementary locking means being both encased within said protective shroud, wherein the outer surface of said shroud is tapered in a generally conical manner, said surface closing towards and merging at one end with the outer surface of said pin, said shroud also being free to rotate axially about said pin and said locking means.

8. A locking mechanism as in claim 1 wherein said protective casing is of a generally conical shape and is continually tapered to some degree over its entire length.

9. A locking mechanism as in claim 7 wherein said protective casing is of a generally conical shape and is continually tapered to some degree over its entire length.

* * * * *